United States Patent

Ghilardi

[11] Patent Number: 5,238,040
[45] Date of Patent: Aug. 24, 1993

[54] SELF-SUPPORTING CARCASS FOR MOTOR-VEHICLE TIRES

[75] Inventor: Giuliano Ghilardi, Sesto S. Giovanni, Italy

[73] Assignee: Pirelli Coordinamento Pneumatici S.p.A., Milan, Italy

[21] Appl. No.: 760,394

[22] Filed: Sep. 16, 1991

[30] Foreign Application Priority Data

Sep. 14, 1990 [IT] Italy .................. 21466 A/90

[51] Int. Cl.$^5$ .................. B60C 17/04; B60C 13/00
[52] U.S. Cl. .................. 152/517; 152/522; 152/555
[58] Field of Search ............ 152/516, 517, 522, 555, 152/510, DIG. 16

[56] References Cited

U.S. PATENT DOCUMENTS

| | | |
|---|---|---|
| 3,207,200 | 9/1965 | Boussu et al. |
| 3,292,681 | 12/1966 | Travers. |
| 3,717,190 | 2/1973 | Boileau. |
| 3,954,131 | 5/1976 | Hoshino et al. |
| 4,193,437 | 3/1980 | Powell. |
| 4,282,918 | 8/1981 | Tomoda et al. ............ 152/510 |
| 4,396,051 | 8/1983 | Ogawa et al. ............ 152/DIG. 16 |
| 4,779,658 | 10/1988 | Lawabata et al. |
| 4,790,365 | 12/1988 | Sandstrom et al. ............ 152/510 |

FOREIGN PATENT DOCUMENTS

| | | |
|---|---|---|
| 0385192 | 9/1990 | European Pat. Off. |
| 2331530 | 1/1974 | Fed. Rep. of Germany. |
| 1296073 | 5/1962 | France. |
| 2137339 | 12/1972 | France. |
| 0031404 | 9/1977 | Japan ............ 152/517 |
| 0106304 | 6/1984 | Japan ............ 152/555 |
| 0297306 | 11/1989 | Japan ............ 152/555 |
| 62689 | 10/1971 | Luxembourg. |
| 1372638 | 11/1974 | United Kingdom. |
| 2087805 | 6/1982 | United Kingdom. |

Primary Examiner—Michael W. Ball
Assistant Examiner—Nancy T. Krawczyk
Attorney, Agent, or Firm—Stevens, Davis, Miller & Mosher

[57] ABSTRACT

A pneumatic tire having a carcass 1 and at each sidewall 5 thereof are a first and a second elastomeric reinforcement inserts 13, 15 interposed between a first and a second carcass plies 10, 11. Each insert is thinner towards the respective opposite radial ends of its section. The reinforcement inserts 13, 15 are adjacent and in alignment with the maximum width of the tire 2 at a point 14. A third elastomeric insert 16 of lenticular section, internally covers the first carcass ply 10 and has an area of maximum thickness 16a in substantial alignment with the point of adjacency 14 between the reinforcement inserts 13, 15. The first and second reinforcement inserts 13, 15 behave like stiff arms, mutually hinged at their point 14 of adjacency. The movement of the arms toward each other is counteracted by a third elastomeric insert 16 acting as a spring therebetween.

10 Claims, 2 Drawing Sheets

SELF-SUPPORTING CARCASS FOR MOTOR-VEHICLE TIRES

BACKGROUND OF THE INVENTION

The present invention relates to a self-supporting carcass for motor-vehicle tires, of the type comprising a pair of circumferentially inextensible anchoring rings or bead cores, each embedded in a bead defined along an inner circumferential edge of a tire. A pair of elastomeric fillers each of which extends along an outer circumferential edge of one of the anchoring rings, tapers radially away from the tire axis. A second carcass ply is superposed over a first carcass ply in a radially outer position, at least one of said carcass plies has its edges folded back around the bead cores and the elastomeric fillers. A tread band is disposed crown-wise to said carcass ply and a circumferentially inextensible belt structure extends as a ring, interposed between the carcass plies and the tread band. At least a pair of annular reinforcement inserts, made of elastomeric material of lenticular section, each of which is interposed between the first and second carcass plies, at a tire sidewall extends radially between one of the beads and the corresponding end of the belt structure.

The carcass in accordance with the invention is of the type used when it is desired that a tire have the capability of covering considerable distances at fair speed even in the case of complete deflation, for example as a result of a puncture.

It is known that there are different types of tires commonly referred to as "self-supporting tires" which have the quality of enabling a motor-vehicle to go on running at fair speed even when the tire has been accidentally deflated.

Among the different solutions suggested for the achievement of this particular feature it is particularly advantageous to adopt a carcass structure having reinforced sidewalls so that they can elastically withstand the load on the wheel when the sustaining action normally exerted by the air contained in the tire is no longer present. This solution has aroused great interest in the field, as it appears potentially capable of offering the self-support quality without impairing other characteristic performances of the tire too much, such as for example the direction steadiness, roadholding, side steadiness when turning and weaving and, also important, comfort during the ride.

It is apparent that this type of carcass, in order to be able to work in both situations, needs to be mounted on a rim of the type provided with suitable protuberances, commonly referred to as humps, ensuring the tire beads to be held on the wheel rim bead seats even in a situation of complete deflation.

The foregoing being stated, it is noted that the present carcass for self-supporting tires having reinforced sidewalls can be substantially classified in two different types.

THE PRIOR ART

One carcass type, for example described in U.S. Pat. No. 4,193,437, features at least one annular insert of elastomeric material and lenticular section is inserted in each of the tire sidewalls, said insert being applied to a position axially internal to the carcass ply or plies. This insert has the task of elastically supporting the load weighing on the wheel in case of deflation, due to its resistance to crushing and or bending.

It is however to be pointed out that in order to give an appropriate self-support capability to the above mentioned inserts, they need to have important sizes and a great hardness, which results in the development of high heat amounts in the carcass both when the ride takes place in a deflated condition and when the tires are inflated to a normal pressure. Since heat thus produced is difficult to remove, it brings about undesired overheating and, as a result, a quick decay of the strength features in the tire structure.

In addition, the high stiffness necessarily given to the reinforcing insert greatly impairs the ride comfort.

In an attempt to solve these problems a second type of self-supporting carcass has been devised, such as for example that disclosed in British Patent No. 2,087,805, in which it is provided that at least one of the reinforcing inserts disposed in each of the sidewalls be interposed between two of the carcass plies. While this solution has led to important improvements as compared with those previously described, it still has some problems limiting its field of application.

Firstly, it has been found that during the ride both under conditions of normal pressure inflation and under conditions of even partial deflation, the ply or plies disposed in the innermost regions of the tire are submitted to anomalous compressive stresses due to the vertical loads and drift thrusts weighing on the tire itself. These stresses and the resulting localized overheating easily lead to an early yielding of the tire structure. In addition the insertion of an elastomeric reinforcement piece between the plies, in the region of maximum chord and bending of the tire has been found to greatly condition the stiffness value of the tire sidewall, which adversely affects the comfort during the ride.

SUMMARY OF THE INVENTION

The main object of the present invention is substantially to solve the problems of the known art, by providing a self-supporting carcass capable of minimizing the likelihood that the carcass plies in an axially internal position may work in compression under any use condition, that is when the tire is properly inflated and when it is deflated, while at the same time moving the plies away from the area in which the maximum heat generation occurs, which will bring about important advantages as regards the thermal level reached and therefore the maintenance of adhesion between the ply cords and the elastomer around them.

Another object of the invention is to provide a carcass imparting optimal flexibility features to the tire sidewalls for the purpose of achieving excellent comfort under any ride condition.

The foregoing and further objects that will become more apparent in the course of the present description, are substantially attained by a motor-vehicle tire having a self-supporting carcass, characterized in that each tire sidewall comprises:

A first annular reinforcement insert interposed between the first and second carcass plies, having an area of maximum thickness disposed substantially in alignment with the outer radial edge of the corresponding bead filler, and from which area two portions extend, the first portion being radially inner of the annular reinforcement insert and extending alongside the filler and tapering substantially in alignment with the bead core and the second portion being radially outer of the annular reinforcement insert and extending away from the filler while growing thinner as it goes closer to a point of maximum width of the tire:

A second annular reinforcement insert interposed between the first and second carcass plies and having an area of maximum thickness disposed at the junction area between the tire sidewall and tread band and from which two portions extend, one being radially outer, extending substantially in a direction parallel to the tire axis and tapering under a corresponding edge of said belt structure, and the other being radially inner and growing thinner towards the radially external portion of the first annular reinforcement insert, joining the latter close to the point of maximum width of the tire:

A third annular insert of elastomeric material internally lining the first carcass ply and exhibiting an area of maximum thickness disposed substantially in alignment with the junction point between the annular reinforcement inserts, and from which two portions extend, one being radially inner and substantially tapering in alignment with the area of maximum thickness of the first reinforcement insert and the other being radially outer and substantially tapering in alignment with the area of maximum thickness of the second reinforcement insert.

BRIEF DESCRIPTION OF THE DRAWINGS

Further features and advantages will be best understood from the detailed description of a preferred embodiment of a self-supporting carcass for motor-vehicle tires in accordance with the present invention, given hereinafter by way of non-limiting example with reference to the accompanying drawings, in which.

DETAILED DESCRIPTION OF THE INVENTION

In describing this tire, usual terminology will be used with the axis of rotation of the tire/wheel serving as a reference point. Thus the width of the tire extends in an axial direction and the sidewalls of the tire extend generally radially outwardly from the rotational axis.

Figure 1:
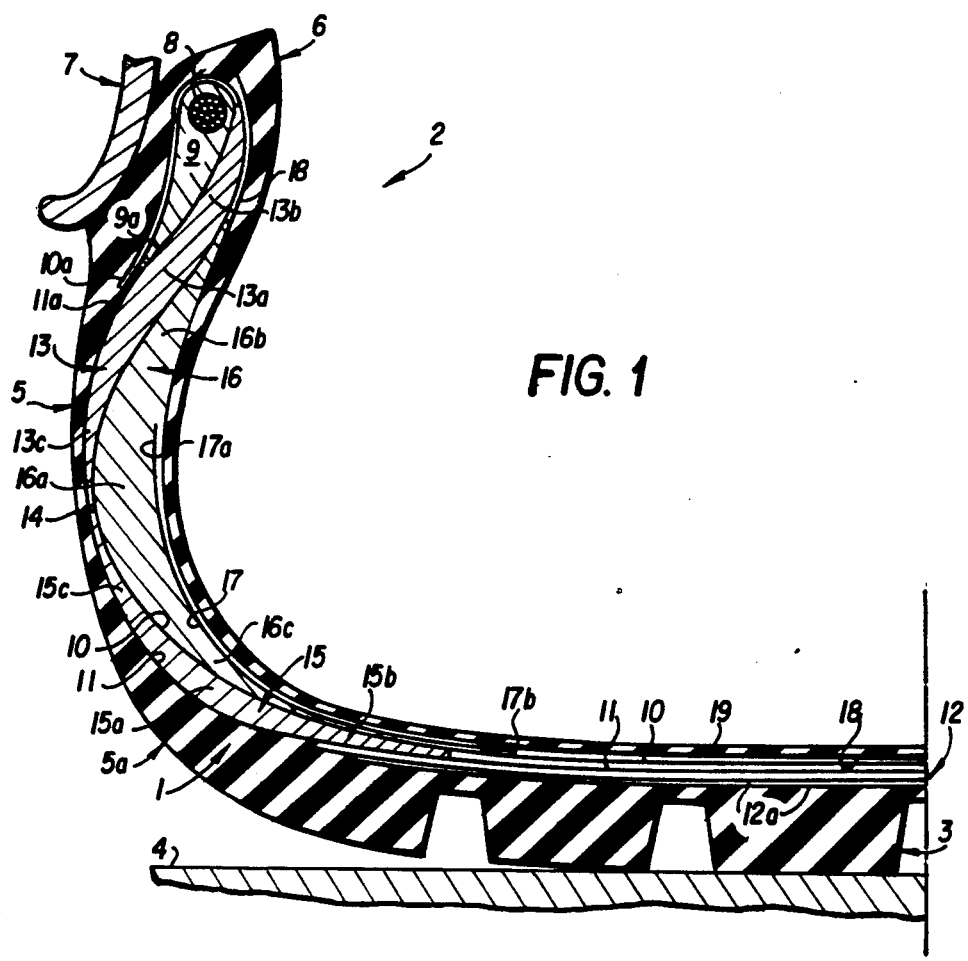
FIG. 1 is a diametrical half section, interrupted at the axial center line, of a tire having a self-supporting carcass in accordance with the present invention, running at a normal inflation pressure.
Figure 2:
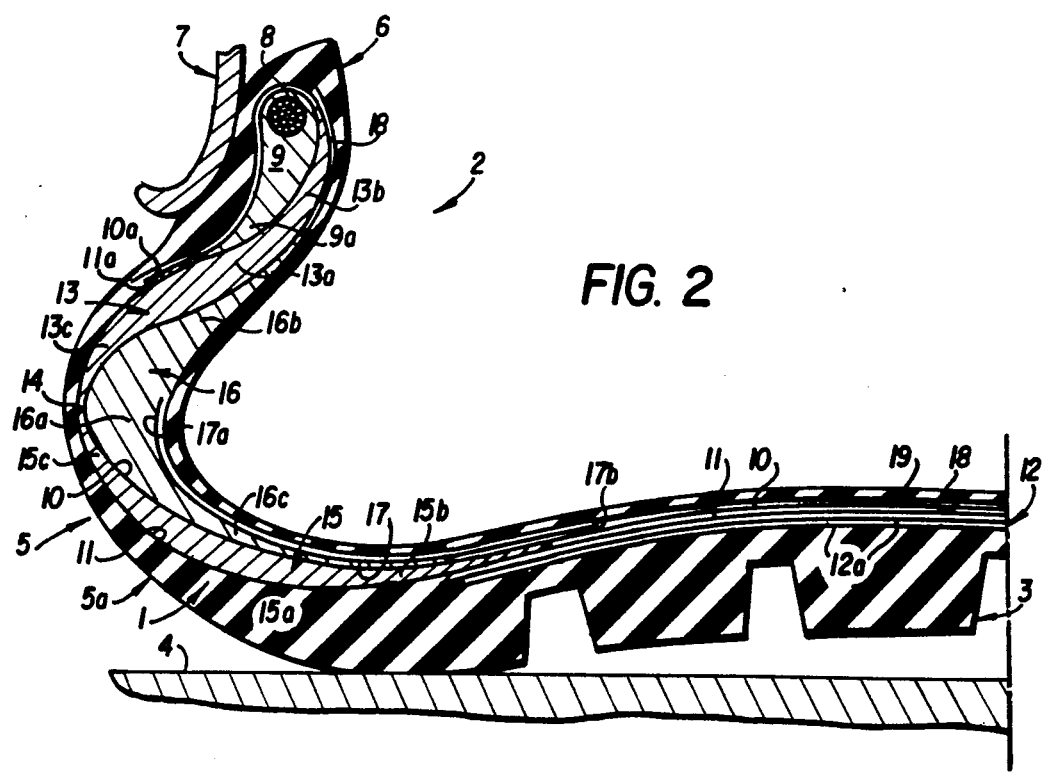
FIG. 2 is a half section similar to that in FIG. 1, showing the tire running under deflation conditions.

Referring particularly to FIGS. 1 and 2, the structural part constituting the essential parts of motor-vehicle tires, usually referred to as a carcass, of a self-supporting type in accordance with the present invention, is generally identified by reference numeral 1.

The carcass 1 is conventionally associated with a tire 2. Defined in the tire, as is known, is a tread band 3 disposed on the crown of the carcass, shaped as a ring and arranged to act by contact with the road surface 4, as well as two sidewalls 5 extending in a substantially radial manner from the opposite edges of the tread band 3, and two beads 6 defined along the radially inner edges of the tire 2, at which beads the engagement takes place between the tire and a rim 7 on which the tire is mounted.

In the accompanying drawings only one of said sidewalls 5 and one of said beads 6 is shown. The carcass 1 conventionally has a pair of bead cores 8, each built into one of the beads 6. The bead cores 8, usually metal cable, are circumferentially inextensible and offer the necessary stiffness to the bead 6 so as to enable the proper assembling of the tire to the rim 7.

Extending along the radial outer edge of each of the bead cores 8 is an elastomeric filler 9, tapering radially away from the tire axis.

Still in a known manner, a first carcass ply 10 and a second carcass ply 11 overlapping the first ply 10 at a radially external position are provided to extend over the whole section of the tire 2. At least one of the carcass plies 10, 11 has its edges 10a, 11a, folded back around the bead cores 8 and the elastomeric fillers 9 in the axial inner to axial outer direction.

Tire 2 also comprises a belt structure 12 which is circumferentially inextensible and is comprised of one or more radially superposed plies 12a, extending as a ring interposed between the carcass 1 and the tread band 3.

In the accompanying figures, for the sake of clarity, the thicknesses of the plies 10, 11, 12a are shown in solid blackened lines spaced apart from one another. In actual practice, the plies are superposed in mutual contacting relationship, except in the region of the sidewalls 5, as better clarified later in this description.

In a novel manner, in accordance with the present invention, the carcass 1 further comprises, for each of the tire sidewalls 5, a first annular reinforcement insert 13 interposed between the first an second carcass plies 10, 11, and having an area of maximum thickness 13a disposed substantially in alignment with the radially outer edge 9a of the corresponding filler 9. Departing from the area of maximum thickness 13a, is a radially inner portion 13b extending alongside the filler 9 and tapering substantially in alignment with the bead core 8, as well as a radially outer portion 13c extending radially outwardly and away from the filler 9 and growing thinner as it goes closer to the point of maximum chord in the tire 2. "Maximum chord" of the tire means the area in which the tire 2 has its maximum width, as measured parallel to its rotational axis.

The carcass 1 in accordance with the present invention also comprises a second annular reinforcement insert 15, interposed between the first and second carcass plies 10, 11 as well, at a radially external position relative to the first reinforcement insert 13. In greater detail, the second reinforcement insert 15 has an area of maximum thickness 15a disposed at a connecting region adjacent the tire shoulder and commonly referred to as a buttress and denoted by 5a, between the sidewall 5 and the tread band 3. Departing from the maximum thickness area 15a is a radially outer portion 15b extending in a direction substantially parallel to the tire axis and tapering under a corresponding edge of the belt structure 12, as well as a radially inner portion 15c growing thinner towards the radially outer latter at a junction point 14 substantially coincident with said maximum chord point.

It is to be noted that the two reinforcement inserts 13 and 15 must not be necessarily joined together at their mutual point of adjacency 14 and neither must they be made of the same elastomeric material they can be two distinct inserts as regards their elastomeric composition and/or they can be physically separated at the adjacency point 14 by a third element interposed therebetween, as hereinafter explained. For convenience, in this description this point of mutual adjacency 14

(where the inserts 13 and 15 may be touching or hinged together) will be referred to as "junction point 14", it being understood that reinforcement inserts 13 and 15 are not in fact rigidly joined together but, at most form a hinge joint.

An important aspect of the present invention is the presence of a third annular insert 16 of elastomeric material; it covers the first carcass ply 10 at a position radially inner on the tire 2. The third annular insert 16 has a respective area of maximum thickness 16a substantially disposed in radial alignment with the junction point 14 between the annular reinforcement inserts 13 and 15. Extending radially inward from this area 16a is a radially inner portion 16b tapering substantially in alignment with the area of maximum thickness 13a of the first reinforcement insert 13. A radially outer portion 16c extends radially outward from area 16a, substantially tapering in alignment with the area of maximum thickness 15a of the second reinforcement insert 15.

The relative sizes of the three inserts 13, 15, 16 can vary depending upon the type of motor-vehicle for which the tire is designed, as well as the operating features to be given to the tire itself.

On the whole, the thickness of inserts 13, 15, 16 is reduced when the tire 2 is intended for light-in-weight cars and/or in order to favor the carcass resistance to high speeds with respect to the lifetime under ride conditions with a flat tire. By way of example, when the tire 2 is intended for use on normal cars, the thickness of the first insert 13 should conveniently be comprised between 2.5 mm and 7 mm, at the area of its maximum thickness 13a, while the thickness of the second insert 15, still referring to its area of maximum thickness 15a, should be in the range of 2.5 mm to 5 mm. The third insert 16, in turn, should preferably have a maximum thickness of between 5 mm and 15 mm at the area 16a.

The thickness of the first and second inserts 13, 15 at the mutual junction area 14 should preferably be less than 3.5 mm.

As regards the elastomeric material of said inserts, it conveniently dynamic modulus (greater than 4 Mpa), (tan. δ less then 0.1) consists of compounds having a high and a low hysteresis which are in particular adapted for this type of use.

A very important function associated with the three inserts 13, 15 and 16 and their sizes, involves conditioning the development of the ply profile on the right section of the tire, as better clarified in the following.

Preferably, associated with the third insert 16 is at least a textile reinforcement strip 17, for example made of nylon or aramide, applied at an axially inner position in relation to the radially outer portion 16c of the third insert itself. The textile reinforcement strip 17 has a first end edge 17a terminating at a radially inner position relative to the junction point 14, between the first reinforcement insert 13 and the second reinforcement insert 15, as well as a second end edge 17b terminating beyond the end of the radially outer portion 16c of the third insert 16.

The whole inner surface of the carcass 1 can be covered with a layer of halobutyl-based elastomeric material 19 highly impervious to air, consisting for example of chlorobutyl or bromobutyl which, at least in the circumferential area substantially extending astride the junction point 14 between the first and second reinforcement inserts 13, 15, in accordance with a further preferential feature of the invention, is replaced by a compound having a high polybutadiene content (at least 30% of parts by weight for 100 parts of compound), to which paraffin is optionally added. In this way an optimal adhesion of the lining layer 18 to the third insert 16 or, in some cases, to the reinforcement strip 17, is ensured, also under ride conditions with a flat tire, together with a high resistance to abrasion and, as a result of the presence of paraffin, a reduction of possible rubbing friction.

The operating behavior of the carcass in accordance with the present invention is as follows.

First of all it is to be noted that advantageously, as part of this invention, the first and second inserts 13, 15 enclosed between the first and second carcass plies 10, 11, substantially behave like two rigid arms mutually hinged at their junction point 14. The third insert 16, in turn, substantially behaves like a spring counteracting the tendency of the first and second inserts 13, 15 to move close to each other due to the load weighing on the motor-vehicle wheel.

Referring to FIG. 1, under conditions of normal use of the tire 2, when the load weighing on the wheel is almost completely counteracted by the pressure of air contained in the tire itself, the third annular insert 16 is only slightly stressed to compression, so that the tire sidewall 5 lends itself to be deformed in the best manner for absorbing impacts and stresses resulting from the presence of asperities on the road surface 4. In other words, the stiffness of the tire which tends to resist to crushing, under this situation and as regards comfort, is substantially identical to that of the best tires having a traditional carcass structure. This is the best operating condition as regards comfort during the ride.

When, to the contrary, due to an accidental puncture a partial or total deflation of the tire 2 occurs, the stiffness tending to resist crushing of the tire of the invention is about twice that of the traditional tires. In this case, as illustrated in FIG. 2, the load weighing on the motor-vehicle wheel is mostly counteracted by the spring reaction supplied by the third insert 16 as a result of its being stressed to compression, said stress being mainly concentrated on the area of maximum thickness 16a. In greater detail, it is to be advantageously noted that, as a result of said stress, the elastomeric material forming the third insert 16 tends to move axially towards the outside of the tire 2, exerting an important thrust force on the first and second carcass plies 10, 11, at the junction point 14 between the first and second inserts 13, 15. Under this situation, one can be sure that the carcass plies 10, 11, are submitted to tractive stresses on the inner extension of their sectional profile Advantageously, on tensioning the carcass plies 10, 11, a spring reaction by the first and second reinforcement inserts 13, 15 takes place, said inserts behaving like counter-deflected leaf-spring arms.

As a result, the inner ply or plies, by effect of the counter-deflection have a tendency to get stretched thereby helping in reducing the likelihood of crushing at the most critical point 14 already supported by the insert 16 and facilitated by the minimization of its distance from the outer ply, that is the ply that mainly controls the local position of the neutral axis under crushing.

Still in order to facilitate the tension distribution between the two plies as much as possible under any use condition, it is to be noted that the lunette shaped second annular reinforcement insert 15 shapes the inner carcass ply 10 according to an equilibrium profile, while on the contrary the outer carcass ply 11 is deformed locally off-profile with a tendency to discharge most of the carcass tension onto the inner ply 10 by free inflation.

As a result, both in normal use and during a ride with a flat tire, when the sidewalls are bent, the outer carcass ply 11 has a natural tendency to increase its contribution to the carcass tensioning, to the detriment of the inner carcass ply 10; however since the latter has been originally preloaded, the possibility of being crushed is greatly reduced.

Therefore, by means of the carcass of the present invention a sharp improvement in the structural resistance of the tire is achieved under ride conditions both with a flat tire and with a normal tire, without the self-supporting feature impairing the ride comfort.

Different practical tests, carried out by the present patentee, have proved the validity of the solutions suggested by the present invention.

In particular, a tire having a carcass in accordance with the invention but devoid of the reinforcement strips 17, has been submitted to a fatigue test under deflation conditions, and compared with tires of the same size made in accordance with the known art, the test conditions being the same. In greater detail, the fatigue test consisted in making the tires under examination run under a completely deflated condition and charged a normal load, against a wheel carrying that load, at a constant speed and with a controlled drift thrust; as regards the control tires, one type of tire in accordance with the known art had a carcass provided with two plies between which, at each of the sidewalls, a single elastomeric insert of lenticular section was interposed. A second type of known tire submitted to test was provided with a carcass having two elastomeric inserts of lenticular section in the sidewalls, one of them interposed between the carcass plies, whereas the other was applied to the inner carcass ply. The same weight has been imposed on the carcasses as an equivalence criterion.

In said ride test under deflation conditions, the tires made in accordance with the invention have substantially shown the same duration (distance covered) as that of the first type of known tire. The duration of the second type of known tire, on the contrary, was shown to be equal to about one-third of the duration of the tire in accordance with the invention.

Fatigue tests have been then carried out on the same types of tires with a 70% overload with respect to the rated load and to a normal inflation pressure.

In these tests, the tire of the invention has exhibited a lifetime more than 20% longer than the second type of known tire. On the contrary, the duration of the first type of known tire has been less than one third as compared with that of the tire of the present invention.

Figure 3:
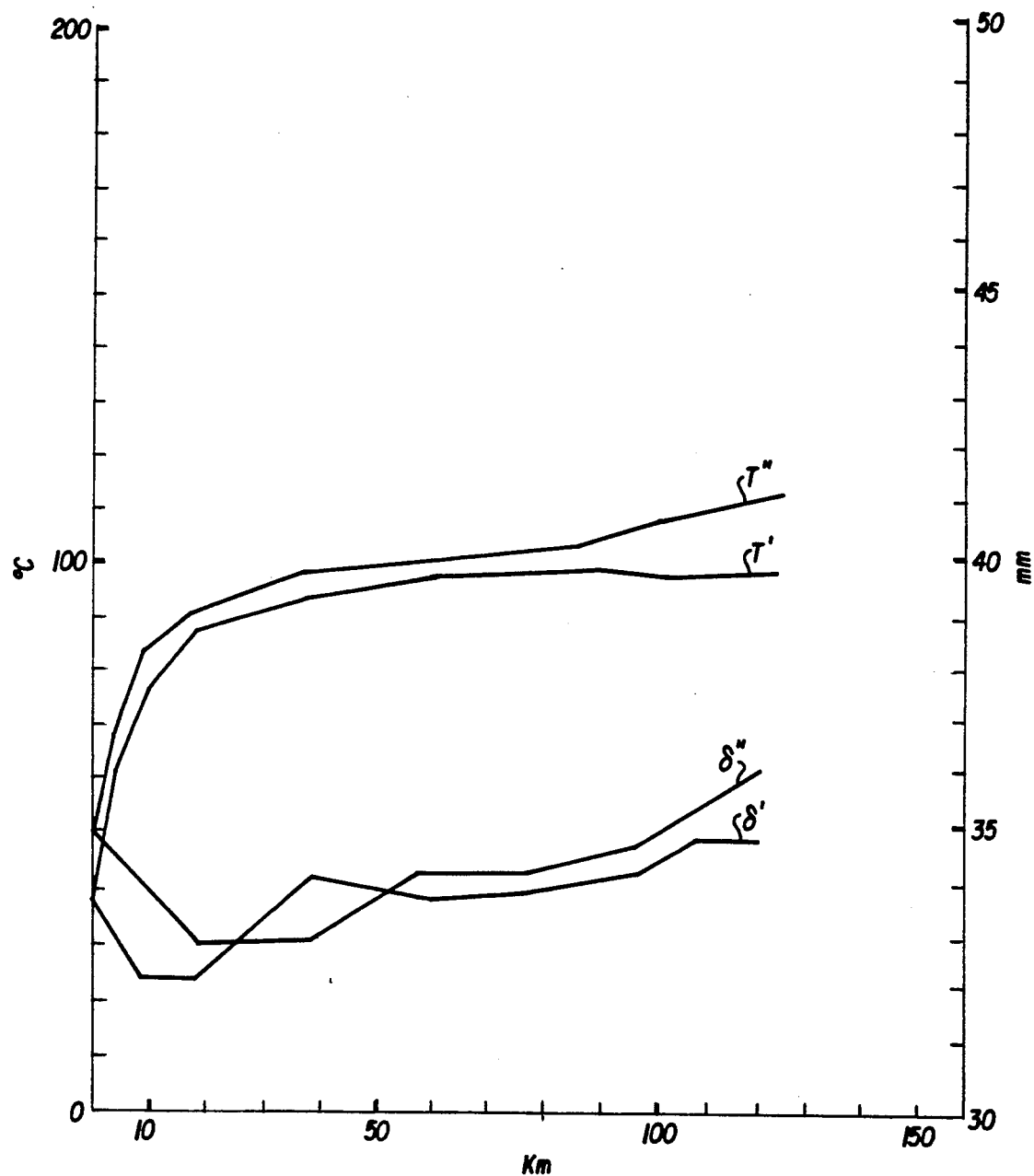
FIG. 3 is a diagram showing variations in temperature and radial deformation depending upon the kilometric distance covered at a constant speed, in tires manufactured following two different embodiments of the invention.

Shown in the graph of FIG. 3 are the variations in temperature and crushing depending upon the kilometric distance covered, which have been measured by submitting two different embodiments of the tire in accordance with the invention to the above mentioned fatigue test under deflated conditions, at a constant speed of 60 km/hour. These embodiments are different from each other only due to the presence of the textile reinforcement strips 17 in the sidewalls 5.

The curves identified by $\delta'$ and $T'$ respectively represent the development of the radial crushing and temperature exhibited by the tire having a carcass provided with the textile reinforcement strip 17, depending upon the distance covered. On the contrary, the curves identified by $\delta''$ and $T''$ represent the development of the crushing and temperature in a tire devoid of the textile reinforcement strip 17. As can be easily seen from FIG. 3, the tire provided with the reinforcement strips 17 has shown a lower increase in temperature as well as a lower crushing, which is evidence of a reduced fatigue of the carcass. It is rather to be pointed out that the embodiment having the reinforcement strip 17 tends to keep the reached asymptotic temperature and crushing conditions, whereas the embodiment devoid of the strip 17, after about 100 kilometers, shows a tendency to a progressive increase in decay value parameter. Therefore the duration until breakage of the tire provided with the textile reinforcement strips 17 has been 50% higher than the embodiment in which said strips are not present.

The achievement of this important result is due to the fact that the textile strip 17 accomplishes the function of a barrier to the wear progress on the insert covered by it, which reduces the negative effects produced by rubbing in the critical area of maximum compression. Thus the present invention attains its intended purposes.

As is clear from the foregoing, the carcass in question offers an important improvement in the distribution of stresses in the tire structure, which brings about a great reduction in the loss of energy due to heat, and therefore a sharp improvement in the tire lifetime as compared with the tires of the known art, both with reference to the ride in a condition of normal inflation pressure, and with reference to the ride with a flat tire.

In addition, the carcass structure in accordance with the invention, while giving a tire a greatly improved self-support feature, does not prevent the side deformability of the same, which is indispensable to the ends of comfort during the ride.

Another important advantage of the present invention comes into play when the vehicle turns a corner or is attempting to pull out of a skid that might be introduced after rapid deflation or a blow-out. It is well known that in most tires when the vehicle turns a corner the outboard sidewall of the tire will be forced axially outwardly beyond the wheel rim flange. One result of such movement is that the point of maximum bending stress shifts toward the tread pattern, thus reaching a carcass zone of less structural resistance to such stresses and thus reducing tire life. The tire construction discussed above has the ability to reduce greatly the tendency for the sidewall to shift axially sideways thus making it easier for a driver to maintain or to recover to straight forward running.

Obviously modifications and variations can be made to the invention as conceived, all of them falling within the scope of the present invention as defined by the following claims.

I claim:

1. A motor-vehicle tire having a self-supporting carcass with a pair of beads and two sidewalls extending radially outward therefrom and a circumferential crown portion connected to said two sidewalls with a tread band disposed radially outward of said crown portion of said carcass, said tire comprising:
   a pair of circumferentially inextensible bead cores, each embedded in one of said beads;
   a pair of elastomeric fillers each extending along a radial outer edge of one of the bead cores and tapering in a direction radially away from the tire axis;

a first and a second carcass ply, at least one of said carcass plies having its edges folded back around the bead cores and the elastomeric fillers;

a circumferentially inextensible belt, structure interposed between the second carcass ply and the tread band; and a pair of first annular reinforcement inserts made of elastomeric material and having a general lenticular shape in cross section, each of which is interposed between said two carcass plies and having an area of maximum thickness disposed substantially at the tapered radial outer edge of the corresponding filler, said first inserts comprising two portions, one said portion extending radially inwardly alongside the filler and tapering to a thinner end substantially in alignment with the bead core and the other of said two portions extending radially outwardly away from said area of maximum thickness while becoming thinner as it approaches a point of maximum width of said tire;

a pair of second annular reinforcement inserts made of elastomeric material and having a general lenticular shape in cross section, each of which is interposed between said two carcass plies and having an area of maximum thickness disposed substantially at the junction between the tire sidewall and the tread band, said second insert comprising two portions, one said portion extending substantially parallel to the tire axis and tapering under an edge of said belt structure, and the other of said two portions becoming thinner towards said outer portion of the first annular reinforcement insert and being adjacent thereto at a point close to the maximum width of the tire so that the point of adjacency forms a hinge joint;

a third pair of annular inserts of elastomeric material, each of which is located axially inward of said two carcass plies and extending from adjacent a corresponding filler to a point under the belt structure and having an area of maximum thickness disposed substantially at the said point of adjacency between the first and second annular reinforcement inserts and comprising two tapering portions substantially tapering down, one said portion being in alignment with the area of maximum thickness of the first reinforcement insert and the other portion being in alignment with the area of maximum thickness of the first reinforcement insert and the other portion of said third annular reinforcement insert extending radially outwardly and substantially tapering in alignment with the area of maximum thickness of the second reinforcement insert.

2. The tire according to claim 1, in which each sidewall further comprises at least one circumferentially extending textile reinforcement strip applied at an axially inward position to the third annular insert and having one end edge terminating at a radially inner position relative to the point of adjacency between the first and second reinforcement inserts and a second end edge terminating axially inwardly past the end of said other portion of the third annular insert.

3. A tire according to claim 1, in which said three pairs of annular reinforcement inserts provide means to impose an equilibrium configuration to the axially internal carcass ply.

4. A tire according to claim 1 including an inner liner of a layer of a halobutyl-based elastomeric material within said carcass and which in at least at the circumferential area extending astride the junction point between the first and second reinforcement inserts the halobutyl-based material is replaced by a compound comprising high polybutadiene content.

5. A tire according to claim 4, in which said polybutadiene content is not less than 30% of parts by weight for 100 parts of compound.

6. A tire according to claim 4, in which said compound having a high polybutadiene content contains paraffin.

7. A tire according to claim 1, in which the thickness of the first reinforcement insert at said area of maximum thickness is in the range of 2.5 mm to 7 mm.

8. A tire according to claim 1, in which the thickness of the second reinforcement insert at said area of maximum thickness is in the range of 2.5 mm to 5 mm.

9. A tire according to claim 1, in which the thickness of the first and second reinforcement inserts at their point of adjacency is less than 3.5 mm.

10. A tire according to claim 1, in which the thickness of the third annular insert at the area of maximum thickness thereof is in the range of 5 mm to 15 mm.

* * * * *